United States Patent
Kimerling et al.

(10) Patent No.: US 7,346,238 B2
(45) Date of Patent: Mar. 18, 2008

(54) GRATING INTO A HIGH INDEX CONTRAST STRIP OR CHANNEL WAVEGUIDE

(75) Inventors: Lionel C. Kimerling, Concord, MA (US); Desmond R. Lim, Singapore (SG)

(73) Assignee: Massachusetts Institute of Technology, Cambridge, MA (US)

( * ) Notice: Subject to any disclaimer, the term of this patent is extended or adjusted under 35 U.S.C. 154(b) by 52 days.

(21) Appl. No.: 10/196,041

(22) Filed: Jul. 16, 2002

(65) Prior Publication Data

US 2003/0031413 A1   Feb. 13, 2003

Related U.S. Application Data

(60) Provisional application No. 60/305,840, filed on Jul. 16, 2001.

(51) Int. Cl.
G02B 6/34 (2006.01)
(52) U.S. Cl. ............................. 385/37; 385/28; 385/122
(58) Field of Classification Search .................. 385/37
See application file for complete search history.

(56) References Cited

U.S. PATENT DOCUMENTS

| | | | | |
|---|---|---|---|---|
| 4,631,730 A | * | 12/1986 | Miller | ....................... 372/50.1 |
| 5,416,861 A | * | 5/1995 | Koh et al. | ..................... 385/14 |
| 5,668,900 A | * | 9/1997 | Little et al. | .................... 385/37 |
| 5,805,750 A | | 9/1998 | Bates | |
| 6,023,354 A | | 2/2000 | Goldstein et al. | |
| 6,591,038 B1 | * | 7/2003 | Pezeshki | ....................... 385/37 |
| 2002/0191912 A1 | * | 12/2002 | Robinson et al. | ............. 385/37 |
| 2003/0031438 A1 | * | 2/2003 | Kambe et al. | .............. 385/122 |

FOREIGN PATENT DOCUMENTS

| EP | 0 480 485 A2 | 4/1992 |
|---|---|---|
| JP | 63 106 605 | 5/1988 |
| JP | 02 025 805 | 1/1990 |

OTHER PUBLICATIONS

"Monolithic Integration of GaAs MSM Photodetector and $SiO_2$/$Si_3N_4$ Dielectric Optical Waveguide," Aboudou et al. *Electronics Letters*. Jan. 2, 1992. vol. 28, No. 1.

* cited by examiner

*Primary Examiner*—Nikita Wells
*Assistant Examiner*—Phillip A. Johnston
(74) *Attorney, Agent, or Firm*—Gauthier & Connors LLP

(57) ABSTRACT

A high index difference coupler includes a high index difference waveguide having one or more modes. A plurality of gratings is formed on the high index difference waveguide. The effective index difference between low index regions and high index regions of the waveguide is greater than 0.3.

12 Claims, 2 Drawing Sheets

GRATING INTO A HIGH INDEX CONTRAST STRIP OR CHANNEL WAVEGUIDE

This application claims priority from provisional application Ser. No. 60/305,840 filed Jul. 16, 2001.

This invention was made with government support under Grant No. DMR-9808941, awarded by the NSF. The government has certain rights in the invention.

BACKGROUND OF THE INVENTION

The invention relates to the field of waveguide fabrication, and in particular to fabricating high index difference waveguides using a high index contrast grating.

High index difference waveguides provide for very small optical devices, thus allowing for dense integration of optical components. One of the difficulties with high index contrast waveguides is their small mode field diameter. As a result, coupling of light from a fiber to a device with a mode diameter of 1 µm or less is difficult.

Gratings have often been used to change the direction of light propagation. Most gratings are low index gratings that have a waveguide effective index difference between the high and low regions of less than 0.3. Applications of low index gratings include coupling of light in and out of waveguides, especially slab waveguides, and coupling light from waveguides or detectors.

High index difference gratings have been used in optical micro-cavities devices, but have not been explored for use in coupling modes in and out of high index difference waveguides. The reason is that low index gratings have much lower scattering loss resulting in higher overall efficiency.

SUMMARY OF THE INVENTION

According to one aspect of the invention, a high index difference coupler is provided. The high index difference coupler includes a high index difference waveguide having one or more modes. A plurality of gratings is formed on the high index difference waveguide. The effective index difference between low index regions and high index regions of the waveguide is greater than 0.3.

According to another aspect of the invention, a method of forming a high index difference coupler is provided. The method includes providing a high index difference waveguide having one or more modes. A plurality of gratings is formed on the high index difference waveguide. The method further includes that the effective index difference between low index regions and high index regions of the waveguide is greater than 0.3.

DETAILED DESCRIPTION OF THE INVENTION

Figure 1A:
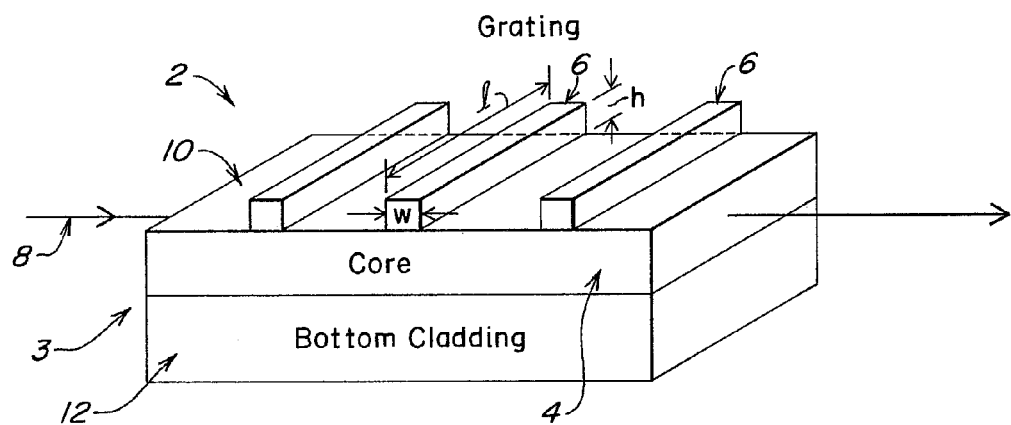
FIGS. 1A-1B are perspective schematic diagrams of two high index difference gratings used for high index coupling.
Figure 1B:
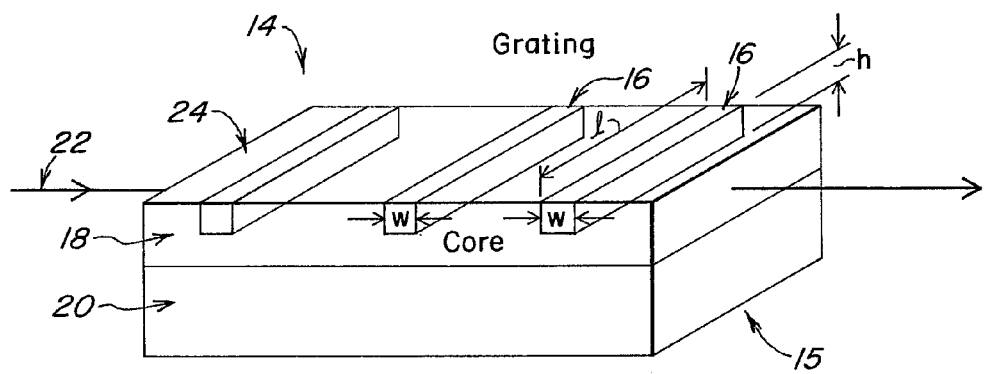

FIGS. 1A-1B are perspective schematic diagrams of two high index difference gratings used for high index coupling. The index difference and the mode of a fiber optic are different from those of a high index difference planar waveguide, resulting in a high coupling loss when the fiber optic waveguide and high index difference planar waveguide are coupled directly. The index difference of a fiber, which is approximately 0.01, is smaller than 0.3 index difference of a square channel waveguide configuration, making the fiber mode larger than the high index difference waveguide mode.

A channel waveguide is a dielectric waveguide whose core is surrounded by a cladding that is composed of a material or materials with refractive indices lower than that of the core, and wherein the peak optical intensity resides in the core. High index difference waveguides can be defined in other waveguide geometries including a rib waveguide. A rib waveguide is a dielectric waveguide whose core is surrounded by a cladding that is composed of materials of which at least one has the same refractive index as that of the core. A high index difference waveguide is defined as one that has a mode-field size similar to that of a high index difference channel waveguide, which is within a 50% difference in cross-sectional area. In these waveguides, cladding is defined as a region where the evanescent field of optical modes exists.

A high index contrast grating is a grating in which the effective index contrast between the high index regions and low index regions that provide the grating is greater than 0.2. This is known in the art as high or large grating strength. Such a device includes the so called photonic band gap devices in which the grating strength is so enormous that a band gap is opened in the E vs. k of the light traveling in the waveguide.

Referring to FIG. 1A, a high index difference grating coupler 2 includes a high index difference waveguide 3, which also includes high index difference gratings 6, a core 4, bottom cladding 12, and a top surface 10 of the core 4. The bottom cladding 12 can be composed of materials that have refractive indices lower than that of the core. In this embodiment, the core 4 has a refractive index greater than 2.0. However, the refractive index of the core 4 can vary. The high index difference gratings 6 are fabricated on the top region 10 of the core 4.

The high index difference gratings 6 are sized to have a width w, length l, and height h. These dimensions can vary, for example, the length l of the high index difference gratings 6 can include the entire length of the high index difference waveguide 3. In other embodiments, the length l of the high index difference gratings 6 can also be less than the entire length. Each of the high index difference grating elements can each have different dimensions relative to each other.

The invention uses the high index difference gratings 6 to couple light in and out of the high index contrast waveguide 3. The gratings 6 are made with a periodicity along the direction of propagation. As a result, a light 8 that is propagating in the waveguide 3 can be coupled out into free space mode or a mode of an adjacent waveguide. In addition, there can be periodicity on an axis perpendicular to the direction of propagation in the waveguide. This allows a focusing of light to enable it to be coupled into high index contrast waveguides with small mode field diameters from waveguides with large mode field diameters.

The grooving of the high index difference gratings 6 is such that the index refraction of the low index regions and the high index regions is greater than 0.3. By selecting a very small grating region, this deflects a significant amount of power into or out of a waveguide.

The gratings 6 can also be low index gratings. The main difference between a low and high index contrast gratings is the length of the grating required to coupled light in and out of the waveguide 3, the sensitivity of the grating to roughness and fabrication error, and the larger bandwidth of the high index difference grating. However, by controlling the roughness and fabrication error, very small grating devices are possible, which in turn leads to small sized detectors and fiber coupling devices.

FIG. 1B shows another embodiment of a high difference index coupler 14 for high index coupling. The high difference index coupler 14 includes a high index difference waveguide 15, which includes a core 18, a bottom cladding 20, high index difference gratings 16, and an open region 24 of the core 18. The major difference between the high index coupler 14 and high index coupler 2 is that the high index difference gratings 16 are fabricated on the open region 24 that is internal to the core 18. The open region 24 includes the high index difference gratings 16 having planar strips of different index materials completely embedded in the core to a depth h where each strip is separated by the core material. This arrangement provides more coupling of a light 22 entering the high index coupler 15.

As similarly described for high index difference grating 6 hereinbefore, the high index difference gratings 16 are sized to have a width w, length l, and height h. These dimensions can vary, for example, the length l of the high index difference gratings 16 can include the entire length of the high index difference waveguide 2. In other embodiments, the length l of the high index difference gratings 16 is less than the entire length. Also, each of the high index difference grating elements 16 can each have different dimensions relative to each other. The size of the open region 24 is essential in determining the number and the size of the high index difference gratings 16.

The grooving of the high index difference gratings 16 is similar to that of the high index difference gratings 6, which is the index refraction of the low index regions and the high index regions is greater than 0.3. By selecting a very small grating region, this deflects a significant amount of power into or out of a waveguide. Also, in this embodiment, the gratings 16 can be low index gratings. The same principles discussed hereinbefore regarding gratings 6 having low index gratings can also be applied to gratings 16.

Figure 2A:
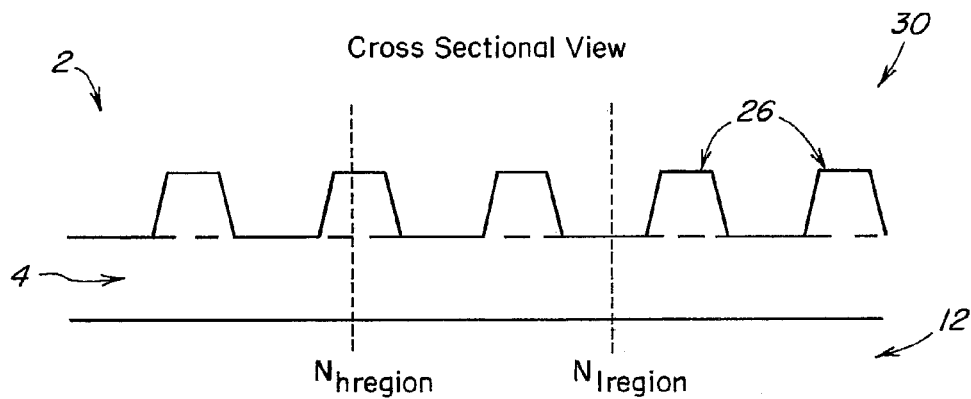
FIGS. 2A-2B are cross-sectional schematic diagrams of two high index contrast grating couplers.
Figure 2B:
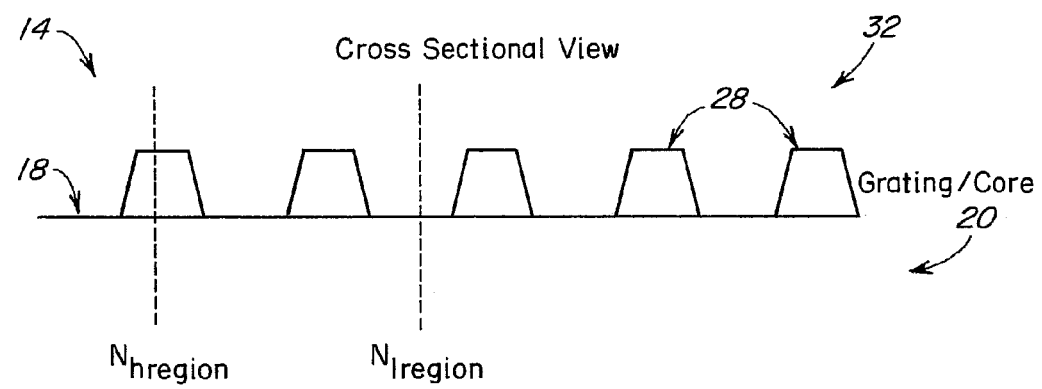

FIGS. 2A-2B are cross-sectional schematic diagrams of the high index contrast grating couplers 2 and 14, respectively. In this embodiment, the couplers 2 and 14 are silicon nitride waveguides with the cores 4 and 18 having an index greater than 2 and low index regions that are air (index of 1). A light of 850 nm is coupled into the waveguides 2 and 14 using these gratings.

Referring to FIG. 2A, high index difference gratings 26 are fabricated on the top surface of the core 4. Also, the high index difference gratings 26 are not rectangular as compared to the high index difference gratings 6 and 16, as shown in FIGS. 1A and 1B. The shape of the high index difference gratings can be varied depending the coupling characteristics being desired. In this embodiment, the top cladding of the high index difference waveguide is air. However, the top cladding can be other materials that satisfy the relationship, described hereinbefore, requiring that the difference of the effective index of refractions between the low index regions and the high index regions be greater than 0.3.

In satisfying this relationship, the effective indices of refraction of the low and index regions must be determined. The low index regions are defined to include the top 30 and bottom 12 claddings. Standard techniques in the art can be used in determining the effective index of refraction of the low index regions. The high index regions are defined to include the high index difference gratings 26 and core 4, and the same standard techniques can be used to determine the effective index of refraction for the high index regions. In mathematical terms, high index difference grating is defined as $$N_{hregions} - N_{lregions} > 0.3 \qquad (1)$$

where $N_{hregions}$ is the effective index of refraction of the high index regions and $N_{lregions}$ is the effective index of refraction of the low index regions.

The high index contrast grating coupler 2 can be achieved by patterning a deep grating onto a high index difference waveguide. This is achieved by depositing a high index layer on a low index layer. The high index layer is patterned to form a waveguide. During this waveguide-patterning step or in a subsequent step, a grating is formed in the high index layer. One of the ways of forming the high index difference grating 28 is by patterning certain regions of the high index layer in a defined shaped using the chemical mechanical polishing (CMP) technique. After forming the gratings 26, a defined core 4 remains of the high index layer. One can vary the thickness of the core 4. Other polishing techniques in the art can be used in forming high index difference gratings on a high index layer.

Coupling into a high index difference waveguide is difficult because of the small effective mode field diameter. Another additional complication is the non-plane wave nature of the mode, which arises in high index contrast waveguides, as a result of their small geometry. By using the gratings 26 with a focusing element, like a taper or a shaped grating, the coupling efficiency can further be improved.

Referring to FIG. 2B, the cross-section of coupler 14 includes the core 18, which is substantially thinner than the core 4. The gratings 28 are similar to the gratings 26, and are fabricated in the same fashion. In particular, the core 18 is polished to have the minimal thickness possible to sustain the gratings 28. Thus, the gratings 28 and core 18 are integrally formed on each other.

The invention can be used for waveguide to detector coupling, fiber to waveguide coupling, waveguide to fiber coupling, and/or waveguide to waveguide coupling. As discussed hereinbefore, the invention provides high index couplers that permit the proper mode field diameter for coupling to various mechanisms without using burdensome techniques. The invention also provides a substantial cost factor in fabricating these couplers.

Although the present invention has been shown and described with respect to several preferred embodiments thereof, various changes, omissions and additions to the form and detail thereof, may be made therein, without departing from the spirit and scope of the invention.

What is claimed is:

1. A high index difference coupler comprising:
   a high index difference waveguide having one or more modes and a core, said high index difference waveguide defines high index regions of said high index difference coupler;
   a bottom cladding positioned below said high index difference waveguide having low index materials, said bottom cladding defines low index regions of said high index difference coupler; and
   a plurality of gratings comprising planar strips of different index materials completely embedded in the core to a depth h where each strip is separated by the core material, wherein the effective index difference between low index regions and high index regions of said high index difference coupler is greater than 0.3 so as to couple modes in and out of said high index difference waveguide, said core comprising a refractive index greater than 2.0.

2. The high index difference coupler of claim 1, wherein said gratings are used to couple light from a different high index difference waveguide.

3. The high index difference coupler of claim 1, wherein said gratings are used to couple light into a different high index difference waveguide.

4. The high index difference coupler of claim 1, wherein the gratings are used to couple light from an optical fiber to a different high index difference waveguide.

5. The high index difference coupler of claim 1, wherein the gratings have a periodicity in the direction parallel to the direction of propagation.

6. The high index difference coupler of claim 1, wherein the high index difference waveguide is comprised of a silicon nitride waveguide.

7. A method of forming a high index difference coupler, said method comprising:
providing a high index difference waveguide having one or more modes and a core, said high index difference waveguide defines high index regions of said high index difference coupler;
forming a bottom cladding positioned below said high index difference waveguide having low index materials, said bottom cladding defines low index regions of said high index difference coupler; and
forming a plurality of gratings comprising planar strips of different index materials completely embedded in the core to a depth h where each strip is separated by the core materials wherein the effective index difference between low index regions and high index regions of said high index difference coupler is greater than 0.3 so as to couple modes in and out of said high index difference waveguide, said core comprising a refractive index greater than 2.0.

8. The method of claim 7, wherein said gratings are used to couple light from a different high index difference waveguide.

9. The method of claim 7, wherein said gratings are used to couple light into a different high index difference waveguide.

10. The method of claim 7, wherein the gratings are used to couple light from an optical fiber to a different high index difference waveguide.

11. The method of claim 7, wherein the gratings have a periodicity in the direction parallel to the direction of propagation.

12. The method of claim 7, wherein the high index difference waveguide is comprised of a silicon nitride waveguide.

* * * * *